United States Patent [19]

Wehler et al.

[11] Patent Number: 5,156,195
[45] Date of Patent: Oct. 20, 1992

[54] TELESCOPIC COVERING

[75] Inventors: Herbert Wehler, Neunkirchen; Georg Wisser, Luckenbach, both of Fed. Rep. of Germany

[73] Assignee: Kabelschlepp Gesellschaft mit beschränkter Haftung, Siegen, Fed. Rep. of Germany

[21] Appl. No.: 568,261

[22] Filed: Aug. 15, 1990

[30] Foreign Application Priority Data

Aug. 28, 1989 [DE] Fed. Rep. of Germany ....... 3928379

[51] Int. Cl.$^5$ ............................................. E05D 15/06
[52] U.S. Cl. ...................................... 160/202; 384/15; 52/67; 74/608; 160/222
[58] Field of Search ............... 160/202, 197, 211, 214, 160/222, 223, 40, 43; 384/15; 74/608; 72/379.2; 224/320; 52/67

[56] References Cited

U.S. PATENT DOCUMENTS

| | | | |
|---|---|---|---|
| 1,126,864 | 2/1915 | Rankin | 160/202 |
| 1,227,152 | 5/1917 | Johanson | 52/67 |
| 1,692,782 | 11/1928 | Mackin | 160/202 |
| 3,363,932 | 1/1968 | Mann | 52/67 |
| 3,570,578 | 3/1971 | Loos | 160/202 |
| 3,578,061 | 5/1971 | Hascheck et al. | 160/202 |
| 3,652,119 | 3/1972 | Hall | 52/67 X |
| 3,751,120 | 8/1973 | Kietz | 384/15 |
| 4,517,956 | 5/1985 | Baker | 52/67 X |
| 4,522,246 | 6/1985 | Bierbrauer et al. | 160/223 |
| 4,635,699 | 1/1987 | Kauffman et al. | 160/211 |
| 4,735,023 | 4/1988 | Posner | 52/67 |
| 4,784,429 | 11/1988 | Hodges | 160/202 X |
| 4,860,917 | 8/1989 | Stöhr | 384/15 X |

FOREIGN PATENT DOCUMENTS

| | | |
|---|---|---|
| 0211118 | 2/1987 | European Pat. Off. . |
| 1300808 | 8/1969 | Fed. Rep. of Germany . |
| 2227971 | 12/1973 | Fed. Rep. of Germany . |
| 3206461 | 9/1983 | Fed. Rep. of Germany ...... 160/202 |
| 3522884 | 10/1986 | Fed. Rep. of Germany . |
| 3613520 | 10/1987 | Fed. Rep. of Germany . |

*Primary Examiner*—Carl D. Friedman
*Assistant Examiner*—Korie Chan
*Attorney, Agent, or Firm*—Robert W. Becker & Associates

[57] ABSTRACT

A telescopic covering is provided that includes a number of cover bodies that fit into one another in a telescopic manner and each comprise a cover wall, two side walls, and a rear wall. To improve the support and guidance of the cover bodies upon and against one another, a respective profiled corner element, which extends in the direction of movement of the cover bodies, is disposed between the cover wall and each side wall of each cover body, with the profiled corner elements serving to support and guide the cover bodies upon one another.

14 Claims, 3 Drawing Sheets

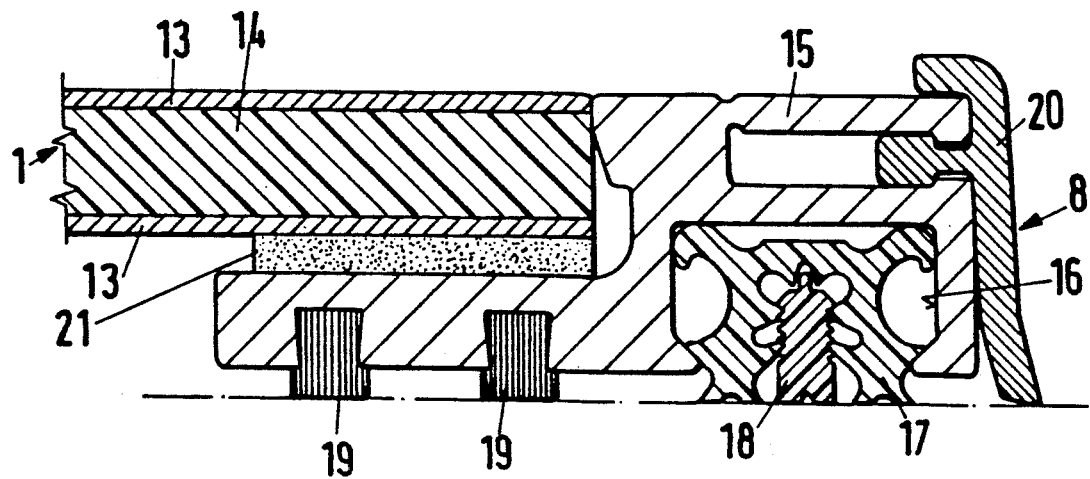
Fig.5
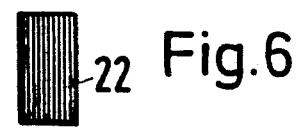
Fig.6
Fig.7
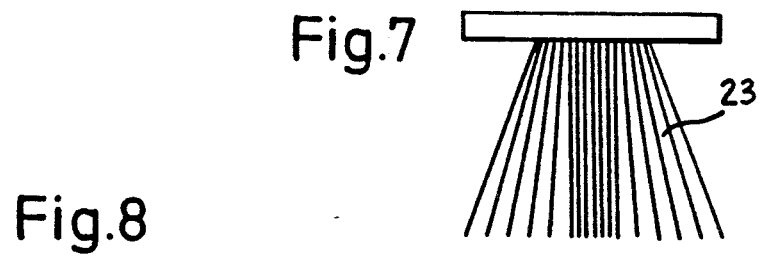
Fig.8
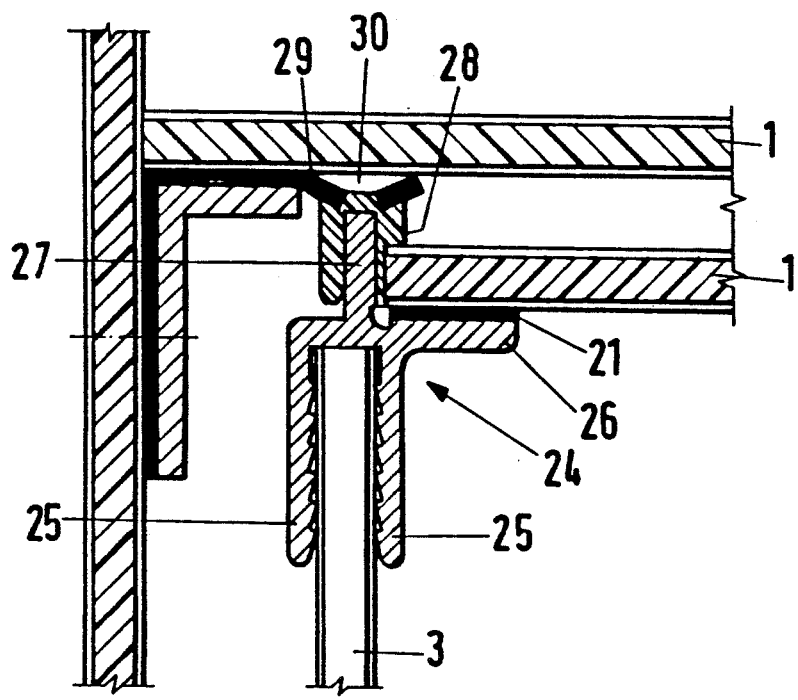

TELESCOPIC COVERING

BACKGROUND OF THE INVENTION

The present invention relates to a telescopic covering for a guideway of a shop machine, and includes a number of cover bodies that fit into one another in a telescopic manner and each comprise a cover wall, two side walls, and a rear wall, whereby a component that is disposed in the plane of the rear wall and projects beyond the cover wall forms an abutment for carrying along the next largest cover body.

DE-PS 35 22 884 discloses a telescopic covering, the cover bodies of which are made of a composite material including two metallic cover sheets and a plastic core. To assemble the cover bodies, special profiled connectors and tongue and groove constructions between the cover wall, rear wall, and side walls were proposed that were welded or fused together. Unfortunately, this known telescopic covering is an inadequate solution for the mutual support and guidance of the lightweight cover bodies. For this purpose, EP-OS 0 211 188 proposes a mechanism for holding together and longitudinally guiding the cover bodies, with this mechanism comprising grooves that extend in the direction of movement, and guide elements that engage in these grooves. However, in other respects the support and guidance of the cover bodies upon one another is effected in a manner conventional in the steel industry. It is obvious that with the longitudinal grooves that extend in the direction of movement, the carrying capacity of the cover bodies is reduced.

It is therefore an object of the present invention to provide a telescopic covering having improved support and guidance between the cover bodies so that it is possible to use lightweight composite panels, associated with which is a drastic reduction in weight.

BRIEF DESCRIPTION OF THE DRAWINGS

This object, and other objects and advantages of the present invention, will appear more clearly from the following specification in conjunction with the accompanying schematic drawings, in which:

FIG. 5 is a cross-sectional view of a wiper arrangement;

FIG. 6 shows a felt wiper lip;

FIG. 7 shows a wiper in brush form; and

FIG. 8 is a cross-sectional view showing the connection between the cover wall and rear wall of a cover body.

SUMMARY OF THE INVENTION

Figure 1:
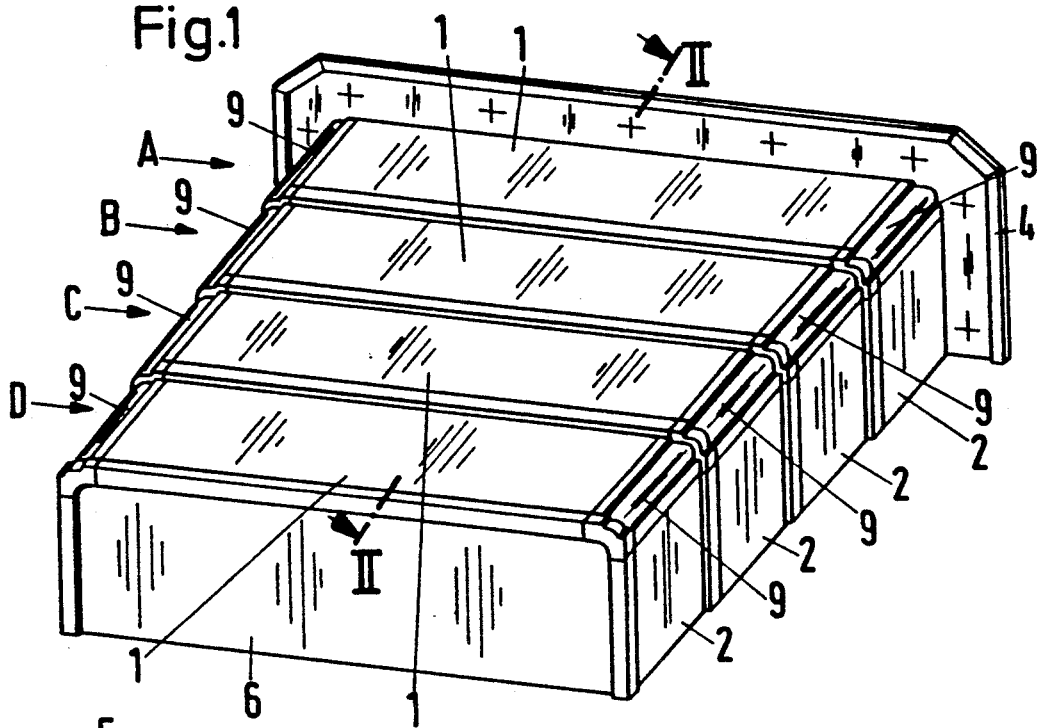
FIG. 1 shows one exemplary embodiment of the inventive telescopic covering in the extended state.
Figure 2:
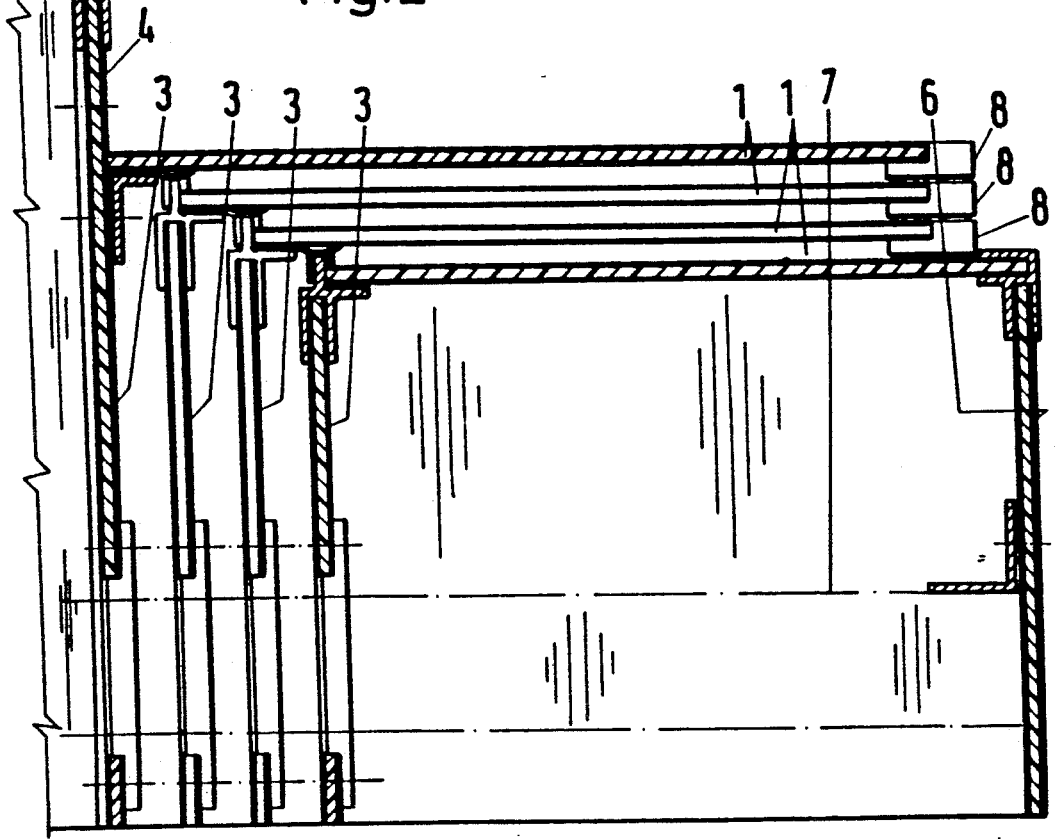
FIG. 2 is a cross-sectional view of the telescopic covering of FIG. 1, in the pushed-together state, and is taken along the line II—II in FIG. 1.
Figure 3:
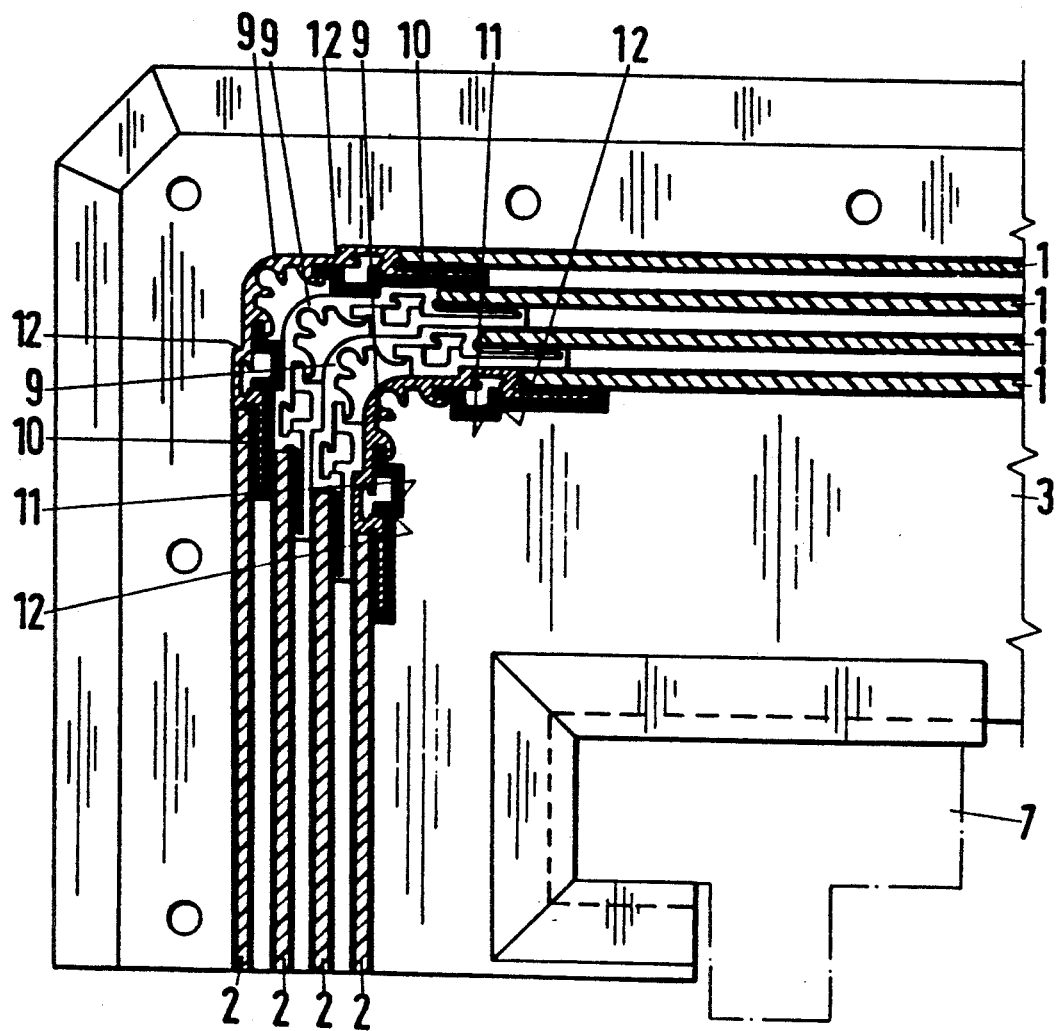
FIG. 3 is a cross-sectional view of one corner of one exemplary embodiment of a pushed-together telescopic covering of the present invention.
Figure 4:
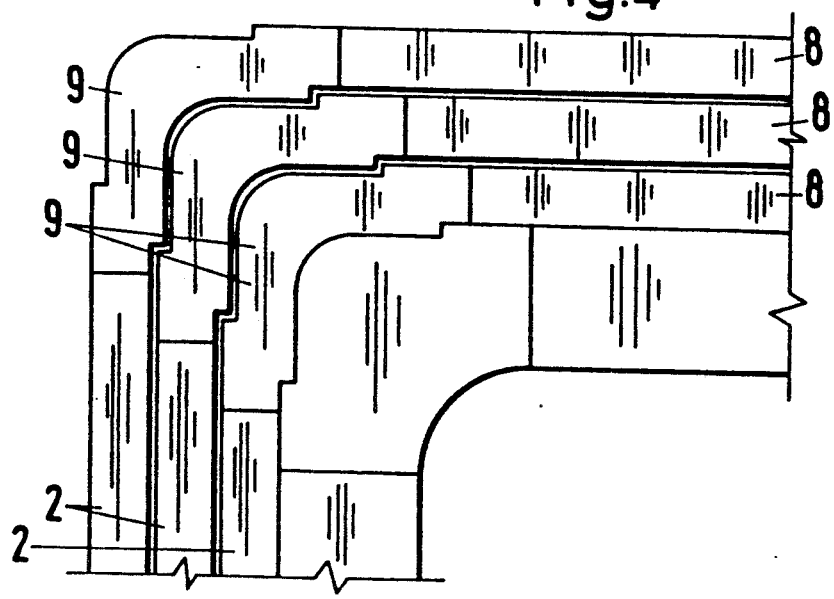
FIG. 4 is a plan view of one corner of a pushed-together telescopic covering.

The telescopic covering of the present invention is characterized primarily in that a respective profiled corner element which extends in the direction of movement of the cover bodies, is disposed between the cover wall and each of the side walls of each of the cover bodies, with these corner elements serving to support and guide the cover bodies upon one another.

Pursuant to one practical specific embodiment of the present invention, the profiled corner elements can be disposed upon the inner side of the cover wall and side walls of the next larger cover body. With this construction principle, it is possible to form the cover wall and the side walls from separate structural components that are connected to one another along the entire length of a cover body via the profiled corner elements, which ride upon one another. Although in so doing the cover wall and the side walls can in a conventional manner be cut out from steel plate, the particular advantage of the inventive construction doesn't really become effective unless the cover wall and/or the side walls are made of a lightweight composite panel including thin cover sheets of aluminum and a lightweight plastic core. For example, the core can be made of polyethylene, while the cover sheets can be made of 0.5 mm thick aluminum. The longitudinal sides of the profiled corner elements, which are made of extruded aluminum, can be provided with a support for the cover wall and the side walls, and both sides of the area of curvature can be provided with interengaging profiled sections that on the underside also permit a plastic profiled sliding element to be rolled in, for example a sliding element made of high density polyethylene.

The inventive profiled corner elements that ride upon one another represent a fundamental departure from the previously known manner of construction where the cover bodies were supported against one another only at the front free end via sliding and wiping strips that extend transverse to the direction of movement and are therefore subjected to great wear, so that they can fulfill their wiping function in an only unsatisfactory manner. In contrast, with the inventive construction principle it is possible to distribute the weight of the cover bodies that are riding upon one another over the entire length of the profiled corner elements, which extend in a direction of movement and do not have to undertake any wiping function. A side effect resulting herefrom is that the wiper strips at the front free end of the cover bodies can be embodied in a different and more effective manner with regard to their wiping function.

Pursuant to a further specific embodiment of the present invention, it is proposed to form the wiper at the front end of the cover bodies from an aluminum retaining strip that is provided with a downwardly open receiving means in which is inserted a U-shaped sliding strip that is made of a polytetrafluoroethylene (PTFE), with a soft wiper lip that is made of a thermoplastic elastomer being held between the legs of the sliding strip, which project out of the receiving means. With this arrangement, it is possible, if necessary, to replace the wiper lip that is made of thermoplastic elastomer with a soft felt wiper lip; it is also possible to use a brush therefor.

It is finally proposed, pursuant to a further specific embodiment of the present invention, to realize the connection between the rear wall and the cover wall of a cover body with a U-shaped, profiled connecting element that is placed upon the rear wall and that at the same time, via a support leg, carries the cover wall; the profiled connecting element is also provided with an attachment ridge that projects upwardly at right angles therefrom and serves for the securement of a profiled sealing and damping element. Pursuant to one practical specific embodiment, this sealing and damping element can have a channel-like configuration and can have two wiper lips that form a channel between them.

With a telescopic covering that is constructed pursuant to the present invention, the cover wall, the side walls, and the rear wall of each cover body can comprise a lightweight composite panel construction and can have their adjacent edges in the direction of movement joined together by the profiled corner elements, and transverse thereto can be joined together via the profiled connecting element that is placed upon the rear wall. A simpler and more effective assembly, support, and guidance of the cover bodies can hardly be imagined.

Further specific features of the present invention will be described in detail subsequently.

DESCRIPTION OF PREFERRED EMBODIMENTS

Referring now to the drawings in detail, the illustrated telescopic covering comprises a plurality of cover bodies A, B, C, D that can be telescopically extended and retracted. Each cover body is formed from a cover wall 1, two side walls 2, and a rear wall 3. The largest cover body A is secured to the support or carriage 5 of a shop machine via a peripheral flange 4. The smallest cover body D is secured to the end of a guideway 7 via a front wall 6. The rear walls 3 of the cover bodies B, C, and D are similarly supported upon the guideway 7. Wipers 8 are disposed at the front, free end between the cover bodies A, B, C, and D. The task of the telescopic covering is to keep the guideway 7 clean.

The cover wall 1 and the two side walls 2 of each cover body are connected via profiled corner elements 9 that extend in the direction of movement and ride upon one another. At their longitudinal edges, the profiled corner elements 9 are provided with supports 10 for the connection to the cover walls 1 and the side walls 2. On their inner sides, the profiled corner elements 9 are shaped in such a way that profiled sliding elements 11 can be rolled in that rest against the outer surface of the next smallest cover body. The profiled corner elements 9 and the profiled sliding elements 11 are guided on and against one another along shoulder means 12 and define the spacing between the individual cover walls 1 and side walls 2. The weight of the next largest cover body is transmitted along the entire length and width of a profiled sliding element 11 to the next smaller cover body. This relieves the wiper 8, which is disposed at the front free end, from any type of support function.

The cross-sectional view of FIG. 5 shows a wiper 8. In addition, FIG. 5 shows that the cover wall 1 can comprise a lightweight composite panel including thin cover sheets 13 and a plastic core 14. The wiper 8 is formed from a retaining strip 15 that is provided with a downwardly open receiving means 16 in which is disposed a U-shaped sliding strip 17. The legs of the sliding strip 17 project beyond the receiving means 16, with a soft wiper lip 18 being held between these legs. Disposed on the inner side of the wiper 8 are two support strips 19, with a cover strip 20 being disposed on the outer side of the wiper. A double-sided adhesive strip 21 is disposed between the cover wall 1 and a support leg of the retaining strip 15 and holds these two structural parts together.

With this construction, it is possible to make the wiper lips 18 of a soft material, for example a thermoplastic elastomer, which has a good cleaning effect. In this connection, the wiper lip 18 is held under preload by inwardly projecting support ribs of the sliding strip 17 and is pressed upon the cover wall 1 that is disposed therebelow.

In place of wiper lips 18 made of a thermoplastic elastomer, it is also possible to use even softer wiper lips 22 of felt (FIG. 6) or a brush 23 (FIG. 7).

As can be seen in FIG. 8, the connection between the cover wall and a rear wall 3 comprises a profiled connecting element 24, two clamping legs 25 of which extend over the rear wall 3, with the profiled connecting element 24 also having a horizontally projecting support leg 26 for the cover wall 1. At the head region, the profiled connecting element 24 is provided with an attachment ridge 27 over which is placed a profiled damping element 28. This damping element 28, via the interposition of two wiper lips 29, rests against the underside of the cover wall 1 of the next larger cover body. The two wiper lips 29 form a channel 30 between them. The connection between the cover wall 1 and the support leg 26 again comprises a double-sided adhesive strip 21.

The present invention is, of course, in no way restricted to the specific disclosure of the specification and drawings, but also encompasses any modifications within the scope of the appended claims.

What we claim is:

1. In a telescopic covering for a guideway of a shop machine, including a number of cover bodies that fit into one another in a telescopic manner and each comprise a cover wall, two side walls, and a rear wall, the improvement wherein:

a respective profiled corner element, which extends in the direction of telescopic movement of said cover bodies, is disposed between said cover wall and each side wall of each of said cover bodies, with said profiled corner elements serving to support and guide said cover bodies upon one another; and a wiper is disposed on a front end of said cover wall and side walls with said wiper comprising a retaining strip that has a downwardly open receiving means in which is inserted a U-shaped sliding strip having legs that project beyond said receiving means, with a soft wiper lip being held between said legs of said sliding strip.

2. A telescopic covering according to claim 1, in which said profiled corner elements of a respective inner one of said cover bodies are disposed on inwardly directed sides of a respective adjacent outer one of said cover bodies.

3. A telescopic covering according to claim 1, in which said cover walls and said side walls are separate structural components that are interconnected via said profiled corner elements along the entire length of a cover body.

4. A telescopic covering according to claim 3, in which said cover wall and/or said side walls comprise a lightweight composite panel that includes a plastic core and thin cover sheets.

5. A telescopic covering according to claim 4, in which said core is made of polyethylene, and said cover sheets are made of 0.5 mm thick aluminum.

6. A telescopic covering according to claim 1, in which said profiled corner elements of adjacent cover bodies are provided on their outer and inner sides with profiled sections, with said profiled sections of said inner sides of said profiled corner elements of an outer one of said adjacent cover bodies respectively intermeshing with said profiled sections of said outer sides of said profiled corner elements of an adjacent inner cover body.

7. A telescopic covering according to claim 1, in which plastic profiled sliding elements are fixed to the underside of said profiled corner elements.

8. A telescopic covering according to claim 7, in which said sliding elements are made of a high density polyethylene.

9. A telescopic covering according to claim 1, in which said profiled corner elements are made of extruded aluminum.

10. A telescopic covering according to claim 1, in which said retaining strip is made of aluminum, said sliding strip is made of polytetrafluoroethylene, and said wiper lip is made of a thermoplastic elastomer.

11. A telescopic covering according to claim 1, in which said wiper lip is made of a soft felt.

12. A telescopic covering according to claim 1, in which said wiper lip is in the form of a brush.

13. In a telescopic covering for a guideway of a shop machine, including a number of cover bodies that fit into one another in a telescopic manner and each comprise a cover wall, two side walls, and a rear wall, the improvement wherein:

a respective profiled corner element, which extends in the direction of telescopic movement of said cover bodies, is disposed between said cover wall and each side wall of each of said cover bodies, with said profiled corner elements serving to support and guide said cover bodies upon one another; and in the region of said rear wall, a profiled damping element is provided that projects beyond the plane of said cover wall; and in which on said rear wall is placed a U-shaped profiled connecting element having two clamping legs, a support leg for said cover wall, and an attachment ridge that extends at right angles to said support leg and upon which said damping element is placed.

14. A telescopic covering according to claim 13, in which said damping element has a channel-like configuration and includes two wiper lips that between them form a channel.

* * * * *